Patented Feb. 12, 1935

1,991,125

UNITED STATES PATENT OFFICE 1,991,125

CELLULOSE NITRATE MULTIACYLATE COMPOUNDS AND PROCESS OF MAKING THE SAME

Cyril J. Staud and James T. Fuess, Rochester, N. Y., assignors to Eastman Kodak Company, Rochester, N. Y., a corporation of New York No Drawing. Application December 31, 1930, Serial No. 505,964

13 Claims. (Cl. 260—101)

This invention relates to a process of preparing mixed cellulose esters containing one nitro and at least two acyl groups of the lower aliphatic acids which are produced by pre-treating the cellulose with one of the acids and subsequently treating it with the anhydride or anhydrides of the remaining fatty acid or acids and a liquid oxide of nitrogen. It is preferred that a catalyst preferably a sulfuric: phosphoric acid mixture be used in this process.

Our invention has for its object the production of esters of cellulose containing a nitrate and two or more fatty acid radicals of 2 to 6 carbon atoms each. These compounds combine all the advantages of the various individual radicals such as flexibility, non-inflammability, and transparency, and the disadvantages, if any, of each radical combined with the cellulose is either reduced to a minimum or completely obliterated.

We have found that mixed esters of cellulose of varied properties may be produced by combining the fatty acid radicals having from 2 to 6 carbon atoms with cellulose, together with the nitrate group. The fatty acid radicals which may be substituted include the normal radicals and also the radicals isomeric to the normal radicals. Where the terms butyric, valeric, or caproic or terms corresponding to these are used throughout this specification it is intended that both the normal and the isomeric radicals are included in this terminology.

Although in the examples given less than five substituent radicals are introduced into the cellulose, a compound having more than four radicals has not been found of sufficient utility to be concerned about at the present time. However, within reason, there is no limit to the number of fatty acid radicals that may be substituted with the nitrate group in the cellulose molecule except the number of the fatty acid radicals of 2-6 carbon atoms.

The following examples are given as illustrations of specific embodiments of our invention.

Example I

To about 5 grams of cellulose (cotton linters) is added a mixture of about 35 grams of glacial acetic acid and a small amount of a mixed catalyst (1 part 96% $H_2SO_4$:3 parts of 95% $H_3PO_4$). This mixture is allowed to stand for 15-20 hours at about 20-25° C. after which 20-25 grams of butyric anhydride are added and the whole is thoroughly mixed. There is then added with stirring 1 c.c. of liquid $NO_2$. After the material is held at a temperature of 20-25° C. for a short time (15 minutes preferred) it is then subjected to a temperature of 50-60° C. The dope formed may be precipitated in cold alcohol if desired. Cellulose nitrate-acetate-butyrate will be found to result from this treatment.

Example II

To about 5 grams of cellulose is added a mixture of 55-60 grams of valeric acid and a small amount of a mixed catalyst. The material is held at a temperature of 50-60° C. for about 15-20 hours. It is then cooled to about 20-25° C. and 30-35 grams of caproic anhydride are added. This mixture is well agitated and about 1 c.c. of liquid $NO_2$ is added with continuous stirring. The material is allowed to remain at a temperature of 20-25° C. for a time as in Example I and is then subjected to a temperature of 50-60° C. The dope may be precipitated in alcohol as in the previous example. Cellulose nitrate-valerate-caproate will be found to result from this treatment.

Example III

About 5 grams of cellulose is placed in a mixture of about 35 grams of glacial acetic acid and a small amount (.2-.5 c.c.) of a mixed catalyst, that given in Example 1 being preferred, and allowed to stand at 20-25° for about 15-20 hours. A mixture of about 20 c.c. of valeric anhydride and about 10 c.c. of butyric anhydride is then added and the whole is thoroughly mixed. There is then added, with stirring, about 1 c.c. of liquid $NO_2$. The material is allowed to stand a short time as in the previous example, and is then subjected to a temperature of 50-60° C. The dope may then be precipitated in alcohol. Cellulose nitrate-acetate-butyrate-valerate will be found to result from this treatment.

As will be observed from the examples, the process comprises treating cellulose with one of the fatty acids of 2-6 carbon atoms and an acetylation catalyst (which catalysts are well known in the art), then adding one or more acid anhydrides corresponding to the fatty acids of 2-6 carbon atoms and liquid higher oxide of nitrogen. The fatty acids or anhydrides suitable in this process are acetic, propionic, butyric, valeric and caproic. If it is desired to substitute unsaturated acyl groups the anhydrides or acids of the oleic series of 2-6 carbon atoms, such as acrylic, crotonic, angelic and hexenic acids or the isomeric acids thereof may be substituted for the saturated acid or acid anhydride in this process where desired. If desired a halogen may be added after acylation so that the unsaturated radical becomes halogenated thus forming a nitrated halogen-substituted acylated cellulose compound. Furthermore, other acylating agents than the acid or anhydride may be employed as known to those skilled in the art in connection with the production of cellulose single acylates.

The proportions of acid used and the order in which they are added may be varied to satisfy the requirements of the finished product. In general, the acyl groups containing the fewer number of carbon atoms are the more readily introduced.

It is to be understood that other acylation catalysts and oxides of nitrogen having a comparatively high boiling point such as $N_2O_3$ and $N_2O_5$, other than those given in the examples, may be used in this process. Obviously, $NO_2$ and $N_2O_4$ are used synonymously in the examples.

Some of the compounds which we have found may be prepared by this process are the following: Cellulose nitro-aceto-propionate, cellulose nitro-aceto-butyrate, cellulose nitro-aceto-valerate, cellulose nitro-aceto-caproate, cellulose nitro-propiono-butyrate, cellulose nitro-propiono-valerate, cellulose nitro-propiono-caproate, cellulose nitro-butyro-valerate, cellulose nitro-butyro-caproate, cellulose nitro-valero-caproate. Of the cellulose esters with four acyl groups the following are among those which may be prepared by this process: Cellulose nitro-aceto-butyro-valerate, cellulose nitro-aceto-propiono-caproate, cellulose nitro-aceto-propiono-valerate, cellulose nitro-aceto-butyro-caproate, cellulose nitro-aceto-valero-caproate, cellulose nitro-propiono-butyro-valerate, cellulose nitro-propiono-valero-caproate, cellulose nitro-propiono-butyro-caproate.

What we now claim as our invention and desire to be secured by Letters Patent of the United States is:

1. A process of making a cellulose nitrate multi-acylate which comprises treating cellulose with a lower aliphatic acid, and treating the resulting product with a known liquid oxide of nitrogen having a boiling point of approximately 3.5° C. or more and at least one lower aliphatic acid anhydride of another aliphatic acid.

2. A process of making a cellulose nitrate multi-acylate which comprises treating cellulose with an aliphatic acid of 2–6 carbon atoms and thereafter treating it with a known liquid oxide of nitrogen having a boiling point of approximately 3.5° C. or more and at least one aliphatic acid anhydride corresponding to an acid of 2–6 carbon atoms other than that with which the cellulose was treated initially.

3. A process of making a cellulose nitrate multi-acylate which comprises treating cellulose with an aliphatic acid of 2–6 carbon atoms and thereafter treating it with at least one aliphatic anhydride corresponding to an acid of 2–6 carbon atoms other than that with which the cellulose was treated initially and a liquid oxide of nitrogen selected from the group consisting of $NO_2$, $N_2O_4$, $N_2O_3$ and $N_2O_5$.

4. A process of making a cellulose nitrate multi-acylate which comprises treating cellulose with an aliphatic acid of 2–6 carbon atoms and thereafter treating it with a known liquid oxide of nitrogen having a boiling point of approximately 3.5° C. or more and an aliphatic acid anhydride corresponding to an acid of 2–6 carbon atoms other than that with which the cellulose was treated initially.

5. A process of making a cellulose nitrate multi-acylate which comprises treating cellulose with an aliphatic acid of 2–6 carbon atoms and thereafter treating it with a known liquid oxide of nitrogen having a boiling point of approximately 3.5° C. or more and a plurality of aliphatic acid anhydrides each corresponding to an acid of 2–6 carbon atoms other than that with which the cellulose was treated initially.

6. A process of making cellulose nitrate multi-acylate which comprises treating cellulose with glacial acetic acid and thereafter treating it with a known liquid oxide of nitrogen having a boiling point of approximately 3.5° C. or more and at least one aliphatic acid anhydride corresponding to an acid of 2–6 carbon atoms other than that with which the cellulose was treated initially.

7. A process of making a cellulose nitrate multi-acylate which comprises treating cellulose with glacial acetic acid and thereafter treating it with liquid $NO_2$ and at least one aliphatic acid anhydride corresponding to an acid of 2–6 carbon atoms.

8. A process of making a cellulose nitrate multi-acylate which comprises treating cellulose with glacial acetic acid and thereafter treating it with liquid $NO_2$ and butyric anhydride.

9. A process of making a cellulose nitrate multi-acylate which comprises treating cellulose with glacial acetic acid and thereafter treating it with liquid $NO_2$ and valeric anhydride.

10. A process of making a cellulose nitrate multi-acylate which comprises treating cellulose with glacial acetic acid and thereafter treating it with liquid $NO_2$ and butyric and valeric anhydrides.

11. A cellulose derivative which contains a nitrate group and three different aliphatic acyl groups each containing 2–6 carbon atoms.

12. Cellulose nitrate-acetate-butyrate-valerate.

13. Cellulose nitrate-acetate with a plurality of acyl groups of 2–6 carbon atoms other than acetyl attached thereto.

CYRIL J. STAUD.
JAMES T. FUESS.